United States Patent
Esswie

(10) Patent No.: US 12,531,606 B1
(45) Date of Patent: Jan. 20, 2026

(54) DYNAMIC POWER ALLOCATION OF SATELLITE DOWNLINK BEAMS

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/774,609

(22) Filed: Jul. 16, 2024

(51) Int. Cl.
  *H04B 7/0426* (2017.01)
  *H04W 52/14* (2009.01)
  *H04W 72/044* (2023.01)

(52) U.S. Cl.
  CPC .......... *H04B 7/043* (2013.01); *H04W 52/143* (2013.01); *H04W 72/0473* (2013.01)

(58) Field of Classification Search
  CPC . H04B 7/043; H04W 52/143; H04W 72/0473
  See application file for complete search history.

(56) References Cited

U.S. PATENT DOCUMENTS

2023/0055988 A1* 2/2023 Liberg ............... H04B 7/18519
2023/0396393 A1* 12/2023 Yao ....................... H04L 5/0057

OTHER PUBLICATIONS

3GPP. "Release 19" [https://www.3gpp.org/specifications-technologies/releases/release-19] retrieved Aug. 4, 2025, 3 pages.
3GPP. "3rd Generation Partnership Project; Technical Specification Group Services and System Aspects; Release 15 Description; Summary of Rel-15 Work Items (Release 15)" 3GPP TR 21.915 V15.0.0, Sep. 2019, 118 pages.

* cited by examiner

*Primary Examiner* — Vineeta S Panwalkar
(74) *Attorney, Agent, or Firm* — Amin, Turocy & Watson, LLP

(57) ABSTRACT

A non-terrestrial radio network node may determine a count, or a number, of user equipment being served by, or that are connected to, the node via at least one non-terrestrial beam. The node may analyze the count, or number, with respect to at least one power increase criterion or at least one power decrease criterion. With respect to a baseline/default power allocation, the node may increase or decrease transmission power allocated to a particular non-terrestrial beam if the beam is determined to serve a number of user equipment that exceeds a configured power increase criterion or that is less than a configured power decrease criterion, respectively. The node may increase or decrease transmission power allocated to a non-terrestrial beam according to a configured power change step value. Based on counts of user equipment served by different beams, the node may determine to allocate different transmission power amounts to different beams.

20 Claims, 12 Drawing Sheets

Dynamic downlink beam power allocation configuration information

- NTN backhaul signaling
- 405 → a first minimum threshold of a number of served user equipment devices per beam above which NTN RAN node triggers per beam power upscale/increase
- 410 → a second minimum threshold of a number of user equipment devices per beam below which NTN RAN node triggers per beam power downscale/decrease
- 415 → one or more per-beam power upscaling or downscaling offsets, or power change step value(s)
- 420 → per beam power update period duration during which number of user equipment served is/are determined

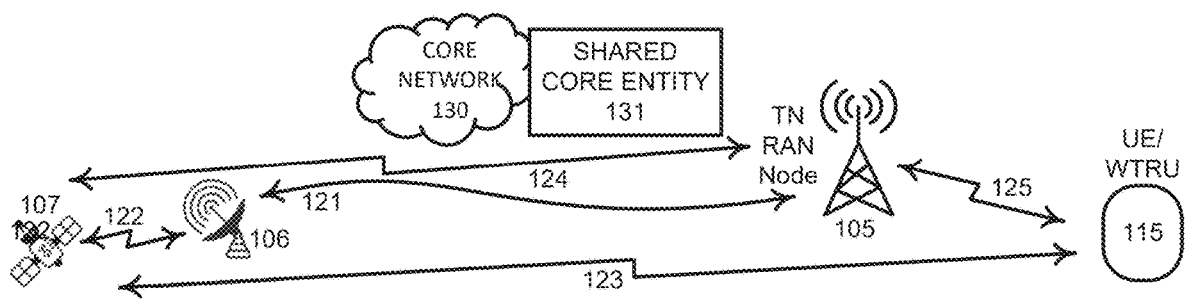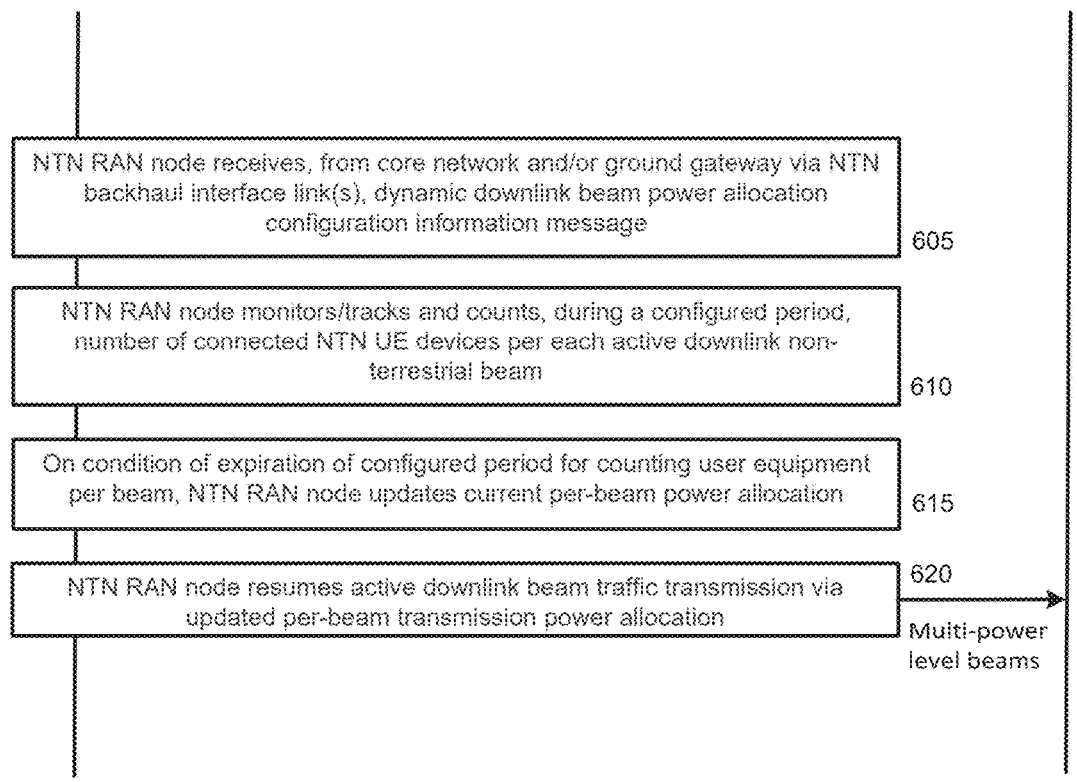
FIG. 6

805 — A method, comprising determining, by a non-terrestrial radio network node comprising at least one processor, at least one number of user equipment being served by at least one non-terrestrial beam corresponding to the non-terrestrial radio network node to result in at least one determined served number corresponding to at least one determined beam of the at least one non-terrestrial beam 810 — analyzing, by the non-terrestrial radio network node, the at least one determined served number with respect to at least one beam power allocation criterion to result in at least one analyzed determined served number 815 — based on the at least one analyzed determined served number being determined to satisfy the at least one beam power allocation criterion, determining, by the non-terrestrial radio network node, at least one determined transmission power corresponding to the at least one determined beam

DYNAMIC POWER ALLOCATION OF SATELLITE DOWNLINK BEAMS

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose, on a given RAN resource, loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise determining, by a non-terrestrial radio network node comprising at least one processor, at least one number of user equipment being served by at least one non-terrestrial beam corresponding to the non-terrestrial radio network node to result in at least one determined served number corresponding to at least one determined beam of the at least one non-terrestrial beam, and analyzing, by the non-terrestrial radio network node, the at least one determined served number with respect to at least one beam power allocation criterion to result in at least one analyzed determined served number. Based on the at least one analyzed determined served number being determined to satisfy the at least one beam power allocation criterion, the method may further comprise determining, by the non-terrestrial radio network node, at least one determined transmission power corresponding to the at least one determined beam.

In an example embodiment, the determining of the at least one determined transmission power may comprise, based on the at least one analyzed determined served number being determined to satisfy the at least one beam power allocation criterion, adjusting, by the non-terrestrial radio network node, at least one transmission power corresponding to the at least one determined beam according to at least one power change step value to result in the at least one determined transmission power being at least one adjusted transmission power. The at least one beam power allocation criterion may comprise at least one power increase criterion, wherein the at least one analyzed determined served number being determined to satisfy the at least one beam power allocation criterion may comprise determining that the at least one analyzed determined served number equals or exceeds the at least one power increase criterion. The adjusting of the at least one transmission power may comprise increasing transmission power corresponding to the at least one determined beam.

In an example embodiment, the at least one beam power allocation criterion may further comprise a criterion that the at least one determined beam correspond to a highest served number of the at least one determined served number. The at least one analyzed determined served number being determined to satisfy the at least one beam power allocation criterion may further comprise determining that the at least one analyzed determined served number is higher than other of the at least one analyzed determined served number corresponding to other beams of the at least one non-terrestrial beam corresponding to the non-terrestrial radio network node.

In an example embodiment, the at least one beam power allocation criterion may comprise at least one power decrease criterion. The at least one analyzed determined served number being determined to satisfy the at least one beam power allocation criterion may comprise determining that the at least one analyzed determined served number equals or does not exceed the at least one power decrease criterion. The adjusting of the at least one transmission power may comprise decreasing transmission power corresponding to the at least one determined beam. The at least one beam power allocation criterion may further comprise a criterion that the at least one determined beam correspond to a lowest served number of the at least one determined served number. The at least one analyzed determined served number being determined to satisfy the at least one beam power allocation criterion may further comprise determining that the at least one analyzed determined served number is lower than other of the at least one analyzed determined served number corresponding to other beams of the at least one non-terrestrial beam corresponding to the non-terrestrial radio network node.

In an example embodiment, the adjusting of the at least one transmission power may comprise adjusting the at least one transmission power according to a power step value that corresponds to the at least one analyzed determined served number.

In an example embodiment, the at least one determined beam may comprise a first beam and a second beam. The at least one determined served number may comprise a first determined served number and a second determined served number, respectively corresponding to the first beam and the second beam. The at least one adjusted transmission power may comprise a first adjusted transmission power corresponding to the first beam and a second adjusted transmission power corresponding to the second beam. The first adjusted transmission power may be different than the second adjusted transmission power.

In an example embodiment, based on a total transmission power capability corresponding to the non-terrestrial radio network node and based on the at least one determined transmission power, the method may further comprise determining, by the non-terrestrial radio network node, a remaining transmission power capability corresponding to the non-terrestrial radio network node to result in a determined remaining transmission power capability, and allocating the determined remaining transmission power capability to at least one remaining beam, other than the at least one determined beam, corresponding to the non-terrestrial radio network node. The at least one remaining beam may comprise multiple remaining beams. The determined remaining transmission power capability may be allocated equally, or uniformly, to the multiple remaining beams to result in a uniform, or equal or substantially equal, transmission power amount being allocated to each of the multiple remaining beams.

In an example embodiment, the determining of the at least one determined transmission power may comprise, based on the at least one analyzed determined served number being determined to satisfy the at least one beam power allocation criterion, adjusting at least one transmission power corresponding to the at least one determined beam according to at least one power change step value to result in the at least one determined transmission power being at least one adjusted transmission power. The equal transmission power amount allocated to each of the multiple remaining beams may be different than the at least one adjusted transmission power.

In another example embodiment, a non-terrestrial radio network node may comprise at least one processor configured to process executable instructions that, when executed by the at least one processor, may facilitate performance of operations that may comprise determining at least one number of served user equipment being served by at least one non-terrestrial beam corresponding to the non-terrestrial radio network node to result in at least one determined served number corresponding to at least one determined beam of the at least one non-terrestrial beam, analyzing the at least one determined served number with respect to at least one beam power allocation criterion to result in at least one analyzed determined served number. Based on the at least one analyzed determined served number being determined to satisfy the at least one beam power allocation criterion, the operations may further comprise adjusting at least one transmission power corresponding to the at least one determined beam according to at least one power change step value to result in at least one adjusted transmission power. The method may further comprise transmitting traffic to at least one of the served user equipment via the at least one determined beam according to the at least one adjusted transmission power.

In an example embodiment, the operations may further comprise receiving dynamic downlink beam power allocation configuration information, directed to the non-terrestrial radio network node by core network equipment, comprising the at least one beam power allocation criterion and the at least one power change step value.

The dynamic downlink beam power allocation configuration information may comprise at least one beam power update period duration indication indicative of at least one beam power update period duration during which the at least one determined served number is to be determined.

In an embodiment, the at least one beam power allocation criterion may comprise at least one power increase criterion usable to determine that the at least one number of served user equipment being served by the at least one non-terrestrial beam equals or exceeds the at least one power increase criterion. The at least one beam power allocation criterion may comprise at least one power decrease criterion usable to determine that the at least one number of served user equipment being served by at least one non-terrestrial beam equals, or is less than, the at least one power decrease criterion. The at least one power change step value may comprise a power increment value according to which the at least one transmission power corresponding to the at least one determined beam is to be increased, based on the at least one number of served user equipment being determined to equal or exceed the at least one power increase criterion, to result in the at least one adjusted transmission power being an increased transmission power. The at least one power change step value may comprise a power decrement value according to which the at least one transmission power corresponding to the at least one determined beam is to be decreased, based on the at least one number of served user equipment being determined to equal or, or to be less than, the at least one power decrease criterion, to result in the at least one adjusted transmission power being a decreased transmission power.

In an example embodiment, the operations may further comprise determining at least one beam, corresponding to the non-terrestrial radio network node, other than the at least one determined beam, to result in at least one remaining beam corresponding to the non-terrestrial radio network node. Based on a total transmission power capability corresponding to the non-terrestrial radio network node. The operations may further comprise determining a remaining transmission power capability. The operations may further comprise allocating, to the at least one remaining beam, the remaining transmission power capability.

In an example embodiment, the at least one beam power allocation criterion may comprise a first beam power allocation criterion and a second beam power allocation criterion. The at least one analyzed determined served number may be a first analyzed determined served number. The at least one determined beam may be determined based on the first analyzed determined served number being determined to satisfy the first beam power allocation criterion. The at least one remaining beam may be a first remaining beam. The operations may further comprise determining at least one number of served user equipment being served by the first remaining beam to result in a first determined remaining served number, and analyzing the first determined remaining served number with respect to the second beam power allocation criterion to result in a first analyzed determined remaining served number. Based on the first analyzed determined remaining served number being determined to satisfy the second beam power allocation criterion, the operations may further comprise determining at least one transmission power corresponding to the first remaining beam to result in a first determined remaining transmission power. The operations may further comprise determining at least one beam other than the at least one determined beam and the first remaining beam, to result in at least one second determined remaining beam. Based on the total transmission power capability and the first determined remaining transmission power, the operations may further comprise determining a second determined remaining transmission power. The operations may further comprise allocating, to the at least one second determined remaining beam, the second determined remaining transmission power.

In yet another example embodiment, a non-transitory machine-readable medium may comprise executable instructions that, when executed by at least one processor of non-terrestrial radio network equipment, may facilitate performance of operations that may comprise receiving, from network equipment associated with the non-terrestrial radio network equipment via at least one non-terrestrial radio link, dynamic downlink beam power allocation configuration information comprising at least one beam power allocation criterion. Based on a served number of a first set of at least one user equipment being served by at least one non-terrestrial beam corresponding to the non-terrestrial radio network equipment being determined to satisfy the at least one beam power allocation criterion. The operations may further comprise determining a determined beam of the at least one non-terrestrial beam. The operations may further comprise determining a transmission power corresponding to the determined beam to result in a determined beam transmission power, and determining at least one beam, corresponding to the non-terrestrial radio network equipment, other than the determined beam, to result in at least one remaining beam corresponding to the non-terrestrial radio network equipment. Based on a total transmission power capability corresponding to the non-terrestrial radio network equipment and based on the determined beam transmission power, the operations may further comprise determining a remaining transmission power capability. The operations may further comprise allocating, to the at least one remaining beam, the remaining transmission power capability, transmitting, to at least one of the first set of at least one user equipment via the determined beam according to the determined beam transmission power, first traffic directed to the at least one of the first set of at least one user equipment, transmitting, to at least one of a second set of at least one user equipment being served by the at least one remaining beam according to at least one remaining transmission power amount corresponding to the at least one remaining transmission power capability, second traffic directed to the at least one of the second set of at least one user equipment.

In an example embodiment, the at least one remaining beam may comprise multiple remaining beams. The at least one remaining transmission power amount may be allocated to the multiple remaining beams to result in each of the multiple remaining beams being allocated a divided remaining beam transmission power amount. The determined beam transmission power may be different that the divided remaining beam transmission power amount.

In an example embodiment, the at least one beam power allocation criterion may comprise a power increase criterion and/or a power decrease criterion. The served number of the at least one of the first set of at least one user equipment being determined to satisfy the at least one beam power allocation criterion may comprise: the served number of the at least one of the first set of at least one user equipment being determined to be equal to or greater than the power increase criterion or the served number of the at least one of the first set of at least one user equipment being determined to be equal to or less than the power decrease criterion.

BRIEF DESCRIPTION OF THE DRAWINGS

Feature(s) and advantage(s) of one or more of the various embodiments of the subject application will become more apparent where described in the detailed description and when taken in conjunction with the accompanying drawings in which:

FIG. 4 illustrates example dynamic downlink beam power allocation configuration information.

FIG. 6 illustrates an example timing diagram of a non-terrestrial radio network node determining an allocation of power to at least one non-terrestrial beam based on a number of user equipment being served by the beam.

FIG. 8 illustrates a block diagram of an example method in accordance with an embodiment of the subject application.

DETAILED DESCRIPTION OF THE DRAWINGS

Figure 1:
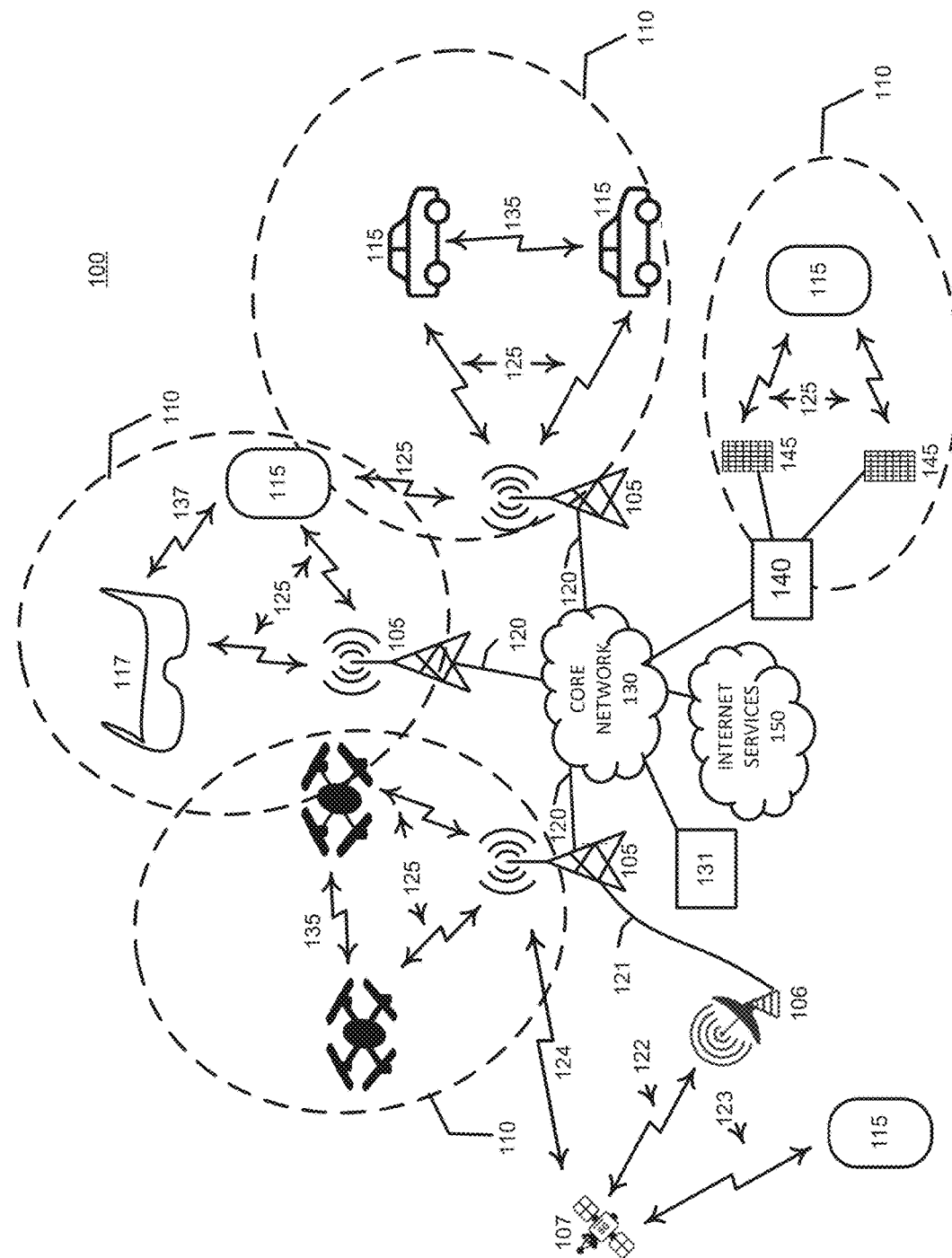
FIG. 1 illustrates an example wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling, or control signaling, that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHZ) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. Such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network gateway, and satellite 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 and 124 to satellite node 107, and links 123 from satellite/node 107 to UE 115, may comprise line-of-sight microwave signal transmission. A UE 115 may be configured with at least one antenna, or at least one processor, to facilitate transmitting or receiving microwave signals to/from satellite node 107 A UE 115 may be configured with at least one antenna, or at least one processor, to facilitate transmitting or receiving microwave signals to/from satellite node 107, and a user equipment so configured or designed may be referred to as a non-terrestrial network capable user equipment, an NTN-capable user equipment, or simply an NTN user equipment. Description herein of, or reference herein to, a radio node or a radio network node may be a description of or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial radio network node may be referred to as a "TN" node. Reference to a satellite node, or a non-terrestrial network node ("NTN node"), may comprise a reference to satellite 107, base station gateway 106, or a combination of satellite 107 and base station/gateway 106.

Core network 130 may comprise, or may be communicatively coupled with, shared core entity 131, which may be referred to as a shared core entity node or a shared core node.

Shared core entity 131 may be associated with TN node 105 or NTN node 107 and may facilitate unified interfacing among TN node 105, NTN node 107, and elements of core network 130. For example, TN node 105 and NTN node 107 may not be configured to communicate directly with one another due to different communication protocols due to absence of direct communication links therebetween, due to configuration incompatibility (e.g., NTN satellite node 107 and TN RAN node 105 being operated by different entities that have declined to configure equipment corresponding to the different entities to interoperate with each other), or due to other reasons. Accordingly, shared core entity 131 may be configured to facilitate joint scheduling, joint interference detection, joint operation of coordination algorithms, or other joint operations between RAN node 105 and NTN node 107. Shared node 131 may facilitate maintaining of user equipment information privacy with respect to RAN node 105 or NTN node 107 that may be operated by a different operator or service provider than an operator or provider with which the user equipment is subscribed to operate. Shared core entity 131 may facilitate executing software instructions that may be provided by an entity other than an operator of NTN node 107 or TN RAN node 105, and thus may facilitate efficient TN-NTN system integration without private terrestrial network information being shared with a non-terrestrial network, and vice versa.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Figure 2:
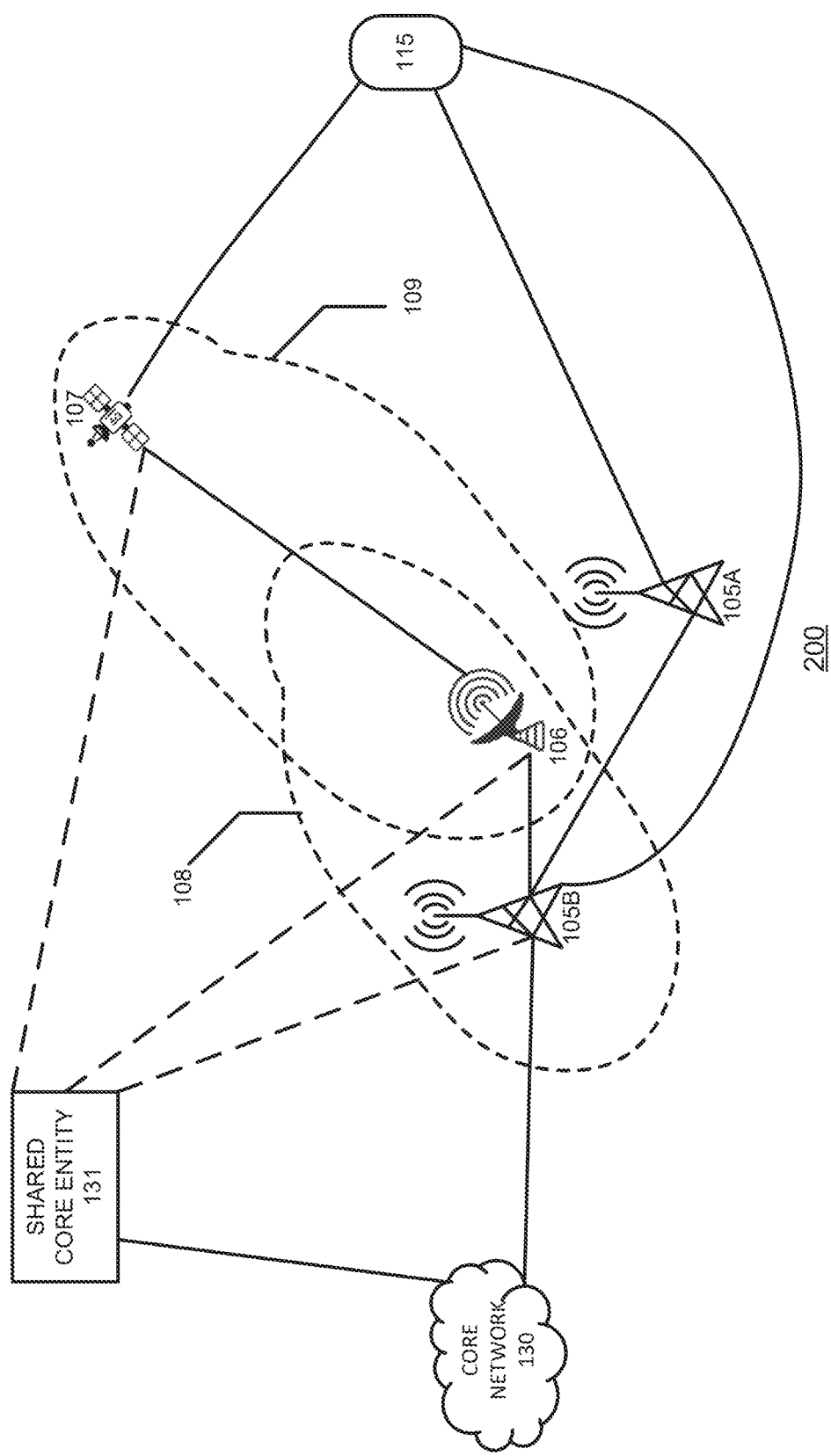
FIG. 2 illustrates an example environment with a satellite base station/gateway and satellite that are capable of communication of traffic corresponding to a radio access network.

Turning now to FIG. 2, the figure illustrates ground-based RAN node 105, base station 106, and NTN node 107, any one or more of which may be referred to as a radio network node. In reference to some embodiments disclosed herein, reference to a TN node may comprise a reference to node 108, which may comprise one or more of terrestrial RAN node 105 or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105. RAN node 105 may communicate directly with satellite node 107 via communication links 124 or via gateway 106 via links 121 and 122.

It may be desirable to implement gNodeB/RAN node functionality on board a non-terrestrial node/satellite node to serve user equipment. However, offering terrestrial-like cellular connectivity via a non-terrestrial radio network node results in various performance-related limitations that may limit overall operation non-terrestrial node operation and/or may challenge backward compatibility of currently-deployed NTN vehicles/satellites (e.g., structures or equipment that may house, facilitate, or embody non-terrestrial network RAN node circuitry and components). A particular performance-related limitations that may result is increased energy consumption due to facilitating full cellular connectivity to ground-based user equipment, which may be an exceptionally large number of devices served via a large geographic footprint compared to a number of user equipment devices served by a single terrestrial radio network node. However, a power source corresponding to a non-terrestrial network node may be very limited compared to ground/terrestrial RAN nodes, thus imposing a significant operation and safety risk to operation of an entire NTN vehicle.

A more specific problem that may exist is that, due to the extensively larger coverage footprint of the NTN RAN nodes, a large number of direct and sharp beams are needed to span the entire NTN coverage area with beams that deliver high capacity. However, since the total transmission power of an NTN node is limited and finite, an NTN node may either adopt a smaller number of wider beams, which requires less transmission power than a larger number of narrow-overage beams and which negatively impacts the ability for an NTN node in terms of traffic capacity and coverage performance as determined by user equipment on the ground.

According to conventional techniques, an equal transmission power must be allocated to each downlink beam, which may facilitate satisfactory decoding and channel estimation at receiving user equipment device, regardless of an importance of each downlink beam in terms of how many user equipment devices are actually served by the NTN node. However, such uniform allocation of power to each NTN beam corresponding to an NTN node tends to impose transmission power limitation, which may negatively impact various emerging NTN deployments and use cases.

To solve one or more problems existing with conventional techniques, embodiments disclosed herein may facilitate an NTN RAN node dynamically determining a per-beam downlink power allocation such that, for a finite total transmission power capability corresponding to the NTN node, per-beam power level(s) is/are dynamically allocated according to importance of the beam(s). For example, a lower transmission power transmission level can be dynamically allocated with respect to an NTN beam that serves part of the Atlantic ocean and that primarily facilitates basic NTN connectivity for a small number of user equipment devices (e.g., user equipment abord ships at sea) with respect to which extreme high-capacity service may not be needed while a much higher transmission power may be allocated to an adjacent NTN beam that is serving large cities with an extremely high number of served NTN user equipment devices. Thus, an NTN RAN node can manage a total transmission power capability corresponding to the NTN node by allocating more power to geographic areas with respect to which high-capacity service is desirable and demanded by customers.

According to conventional techniques, equal power is allocated for all available downlink beams at a RAN node. Such equal/uniform beam power allocation may be suitable for terrestrial RAN nodes due to the smaller coverage footprint corresponding to a terrestrial RAN node and a likely equal/uniform distribution of user equipment devices within a coverage area of the terrestrial RAN node. However, such uniform beam power allocation is undesirable for non-terrestrial RAN node deployments. Accordingly, embodiments disclosed herein facilitate an NTN RAN node determining transmission power for each non-terrestrial beam corresponding to the NTN RAN node based on an importance of each of the beams. A beam's importance may be related to a number of user equipment devices served, or to be served, by the beam. Thus, according to embodiments disclosed herein, a non-terrestrial radio network node may determine a beam power to allocate to a particular non-terrestrial beam, which beam power may be different from a beam power allocated to another non-terrestrial beam corresponding to the non-terrestrial radio network node.

Dynamic Power Allocation of Satellite Downlink Beams.

Figure 3:
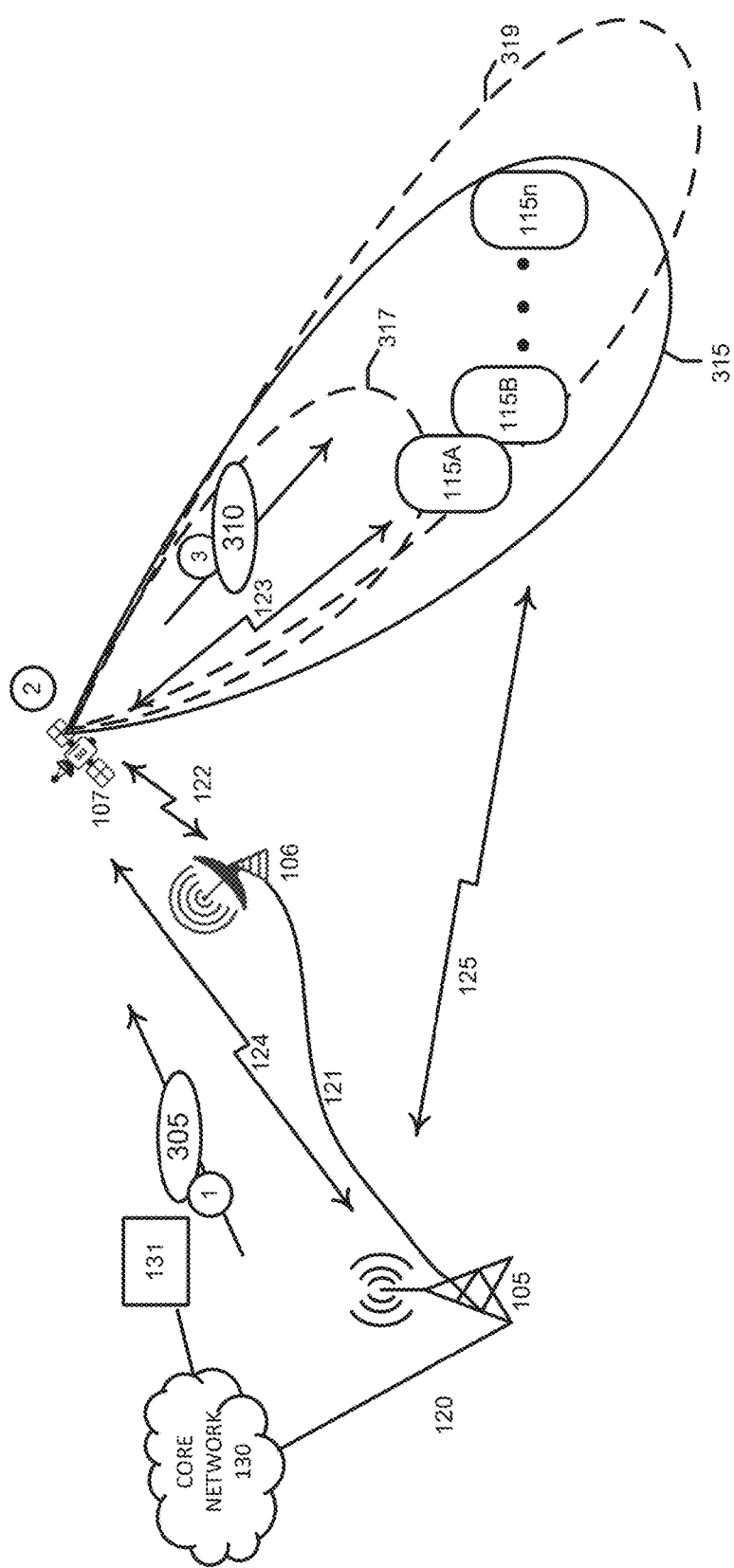
FIG. 3 illustrates an example environment with a non-terrestrial radio network node determining a power of a non-terrestrial beam corresponding thereto based on a number of user equipment being served by the non-terrestrial beam.

Turning now to FIG. 3, the figure illustrates an environment 300. At act 1, NTN node 107 may receive dynamic downlink beam power allocation configuration information 305 from shared network element 131, from an element of core network 130, from terrestrial RAN node 105, or from gateway 106. Information 305 may comprise at least one at least one beam power allocation criterion. At act 2, NTN node 107 may determine that at least one of the at least one beam power allocation criterion configured via configuration information 305 may be satisfied. For example, during a counting period, which may be configured via field 420 in information 305, NTN node 107 may determine a number of user equipment 115A-115n being served by beam 315. Based on a determination made at act 2, NTN node 107 may adjust a power allocated to beam 315. In an example, if NTN node 107 determines that fewer user equipment 115 than a criterion configured via information 305 are being served by beam 315, the NTN node may reduce power allocated to beam 315 to result in reduced power beam 317. In another example, if NTN node 107 determines that more user equipment 115 than a criterion configured via information 305 are being served by beam 315, the NTN node may increase an amount of power allocated to beam 315 to result in increased power beam 319.

As shown by FIG. 3, NTN RAN node receives, at act 1, from core network 130, ground gateway 106, or shared entity 131, via NTN backhaul interface, dynamic downlink beam power allocation configuration information 305. Information 305 may comprise comprising at least one beam power allocation criterion. As shown in FIG. 4, information 305 may comprise in field 405 a minimum threshold, or criterion, of a number of served user equipment devices that may be served by a particular beam, for example beam 315, corresponding to NTN node 107 shown in FIG. 3. If NTN node 107 determines at act 2, as shown in FIG. 3, that beam 315 is serving more user equipment devices 115 then a criterion configured by field 405, NTN RAN node 107 may determine to increase, or upscale, power allocated to beam 315. If NTN node 107 determines at act 2 shown in FIG. 3 that beam 315 is serving fewer user equipment devices 115 then a criterion configured in field 410 shown in FIG. 4, NTN RAN node 107 may determine to decrease, or downscale, power allocated to beam 315. NTN RAN node 107 may determine to increase or decrease a transmission power allocated to beam 315 according to at least one beam power upscaling or downscaling offsets, shown in field 410 of FIG. 4, which may be referred to as power change step value(s). In field 420 shown in FIG. 4, duration information may comprise a user equipment counting period indication indicative of a period, or a duration, during which RAN node 107 may determine a number of user equipment 115 being served by beam 315. NTN RAN node 107 may track, count, or determine a number of connected NTN-capable user equipment devices 115 for each active downlink beam corresponding to the NTN RAN node.

Figure 5:
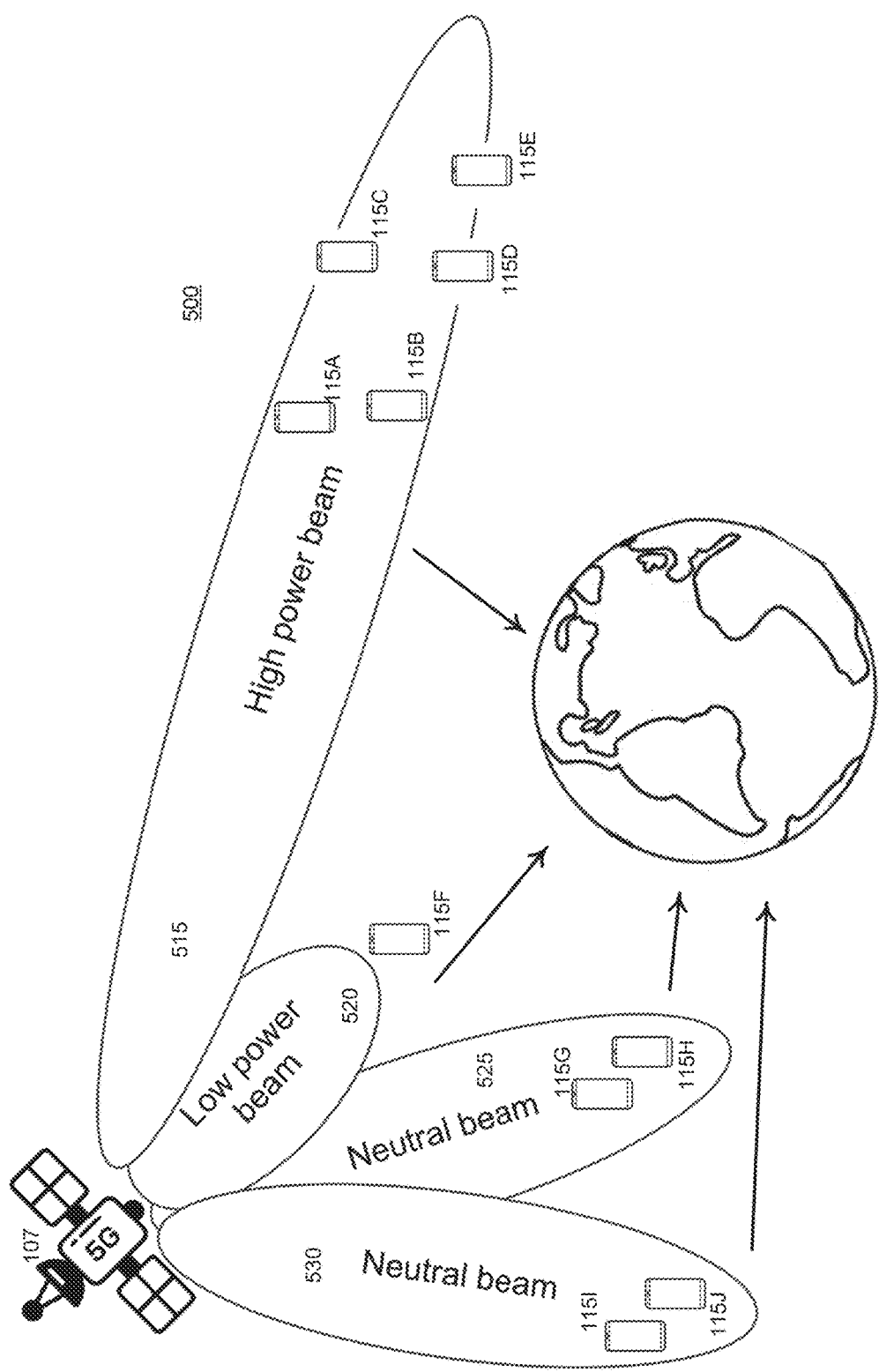
FIG. 5 illustrates an example environment with multiple non-terrestrial beams having different power allocations based on a determination, by a non-terrestrial radio network node corresponding to the beams reduced capability being operated by a satellite non-terrestrial radio network node, of a number of user equipment being served by the beams.

Upon expiration of a counting period indicated in field 420, which may be referred to as a beam power update period, NTN RAN node 107 may update, or adjust, a current per-beam transmission power allocation by performing at least one action, which may comprise determining one or more beams serving a largest number of user equipment device 115 during a just-expired beam power update period indicated or defined, in field 420, which counted number or determined number of user equipment may satisfy a configured minimum power upscaling threshold indicated in field 405 of user equipment 115 being served by a beam. For example, NTN node 107 may determine that beam 515, shown in FIG. 5 as being directed toward North America may serve more user equipment 115 than other beams or more than a criterion. After determining that beam 515 serves more user equipment 115 than beams 520, 525, or 530, RAN node 107 may increase an allocation of a total transmission power capability corresponding to the NTN node to beam 515. RAN node 107 may increase the power of beam 515 by an amount configured in field 415 of information 305 shown in FIG. 4. NTN node 107 may determine that a beam is serving a lowest number of connected user equipment devices 115 devices during a just expired beam power update period with respect to which the determined number of user equipment is less than or equal to a minimum power decrease criterion for example a criterion indicated in field 410 shown in FIG. 4. For example, NTN node 107 may determine that beam 520, which is shown in FIG. 5 as being directed toward the Pacific Ocean, may be serving fewer user equipment than a value configured in field 410. Accordingly, NTN node 107 may decrease transmission power allocated to being 520 by an amount indicated in field 415. After allocating an increased amount of transmission power to beam 515 and allocating a decreased amount of transmission power to being 520, NTN node 107 may determine a remaining amount of transmission power of a total transmission power that the NTN node is capable of using to transmit down traffic to use equipment. NTN node 107 may uniformly, or equally, allocate the remaining transmission power among beams 525 and 530. NTN RAN node 107 may resume, after adjusting allocation of transmission power to beams 515, 520, 525, and 530, downlink traffic transmission according to the adjusted beam transmission power allocation.

Turning now to FIG. 6, the figure illustrates a timing diagram of an embodiment method 600. At act 605, non-terrestrial RAN node 107 may receive via at least one non-terrestrial radio link, dynamic downlink beam power allocation configuration information message comprising dynamic downlink beam power allocation configuration information. The dynamic downlink beam power allocation configuration information may comprise at least one beam power allocation criterion. NTN RAN node 107 may receive the dynamic downlink beam power allocation configuration information from core network 130, shared network equipment 131, or gateway 106 via NTN backhaul interface. The dynamic downlink beam power allocation configuration information may comprise a first threshold/criterion of a number of served user equipment devices determined by NTN node 107 per beam. If NTN node 107 determines a number of user equipment 115 being served by a non-terrestrial beam to be equal to or higher than the first criterion, the NTN RAN node may trigger upscaling, or increasing, transmission power used to transmit traffic via the non-terrestrial beam. The dynamic downlink beam power allocation configuration information may comprise a second threshold/criterion of a number of served user equipment devices determined by NTN node 107 per beam. If NTN node 107 determines a number of user equipment 115 being served by a non-terrestrial beam to be equal to or less than the second criterion, the NTN RAN node may trigger downscaling, or decreasing, transmission power used to transmit traffic via the non-terrestrial beam. The dynamic downlink beam power allocation configuration information may comprise at least one indication of at least one beam power upscaling value or at least one downscaling value. The upscaling or downscaling values may be one or more power change step value(s). The dynamic downlink beam power allocation configuration information may comprise at least one indication of at least one power update duration indicative of a period, or duration, during which NTN node 107 may determine a count of user equipment being served by a beam that is to be compared to the first criterion of the second criterion.

At act 610, NTN RAN node 107 may track, count, or determine a number of connected NTN devices per each active downlink beam corresponding to, or facilitated by, the NTN node. On condition of expiration of a beam power update period/duration configured at act 610, NTN RAN node 107 may update a beam power allocation. Updating an allocation of transmission power for multiple beams corresponding to NTN node 107 may comprise determining one or more beams serving the largest number of user equipment devices during the beam power update period wherein the number satisfies a minimum power upscaling threshold of number of served devices configured at act 605 and increasing the transmission power allocated to the determined one or more beams by a power upscaling offset amount (e.g., a power change step value configured at act 605). The updating an allocation of transmission power may comprise determining one or more beams serving the lowest number of connected user equipment during the beam power update period wherein the number satisfies the second criterion configured at act 605, and NTN node 107 may downscale, or decrease, transmission power allocated to the determined beams by a configured power downscaling offset, or power change step value configured at act 605. Updating an allocation of transmission power may comprise calculating a remaining available total transmission power based on a maximum transmission power capability corresponding to NTN RAN node 107 minus transmission power allocated to the beams determined to serve a number of user equipment that satisfy the first criterion or the second criterion configured at act 605. NTN node 107 may allocate the remaining transmission power equally, or uniformly, among remaining downlink beams corresponding to the NTN node. At act 620, NTN RAN node 107 may resume/continue active transmission of downlink traffic according to an updated/adjusted per-beam transmission power allocation determined by NTN node 107, wherein transmission power associated with different beams corresponding to the NTN node may be different with respect to each other.

Figure 7:
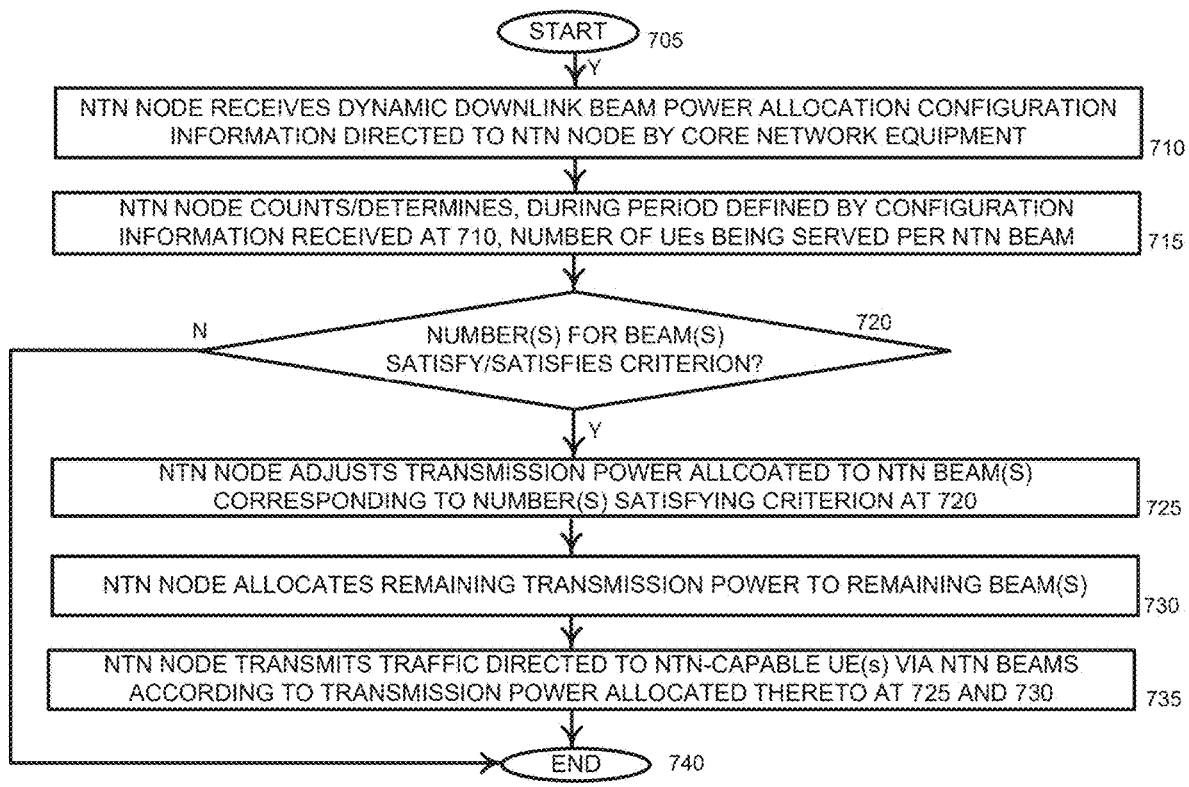
FIG. 7 illustrates a flow diagram of an example method of a non-terrestrial radio access network node determining different power amounts to allocation to different non-terrestrial beams based on a number of user equipment being served by at least one of the beams.

Turning now to FIG. 7, the figure illustrates a flow diagram of an example method 700. Method 700 begins at act 705. At act 710, a non-terrestrial radio network node may receive dynamic downlink beam power allocation configuration information (e.g., configuration information 305 described in reference to FIGS. 3 and 4) from a core network element, a shared core network element, a terrestrial RAN node, a non-terrestrial network gateway, or another element, entity or component associated with the non-terrestrial radio network node. At act 715, the non-terrestrial radio network node may determine, for example by counting, a number of user equipment that are being served by or that are connected to the non-terrestrial radio network node via each of one or more non-terrestrial beams corresponding to the non-terrestrial radio network node. At act 720, the non-terrestrial radio network node may analyze, for each of the one or more beams corresponding to the non-terrestrial radio network node, the number of user equipment determined at act 715 with respect to at least one criterion configured via the configuration information received at act 710. For example, criterion information received at act 710 may comprise a criterion that the non-terrestrial radio network node is to determine a beam having a highest number of user equipment being served by or connected to the non-terrestrial radio network node via the beam. The criterion information received act 710 may comprise a criterion that the non-terrestrial radio network node is to determine whether a beam determined to correspond to the highest number of served or connected user equipment equals or exceeds a criterion, for example a power increase criterion. If at act 720 a non-terrestrial beam is determined by the non-terrestrial radio network node to be serving a highest number of user equipment, wherein the number of user equipment being served exceeds the power increase criterion, the non-terrestrial network node, at act 725, may adjust an allocation of transmission power to the non-terrestrial beam.

In an embodiment, the non-terrestrial network node may determine to increase transmission power allocated to a non-terrestrial beam via which a number of user equipment being served equals or exceeds the power increased criterion even if the non-terrestrial beam is not necessarily a non-terrestrial beam serving more user equipment than any other non-terrestrial beam corresponding to the non-terrestrial radio network node. The non-terrestrial radio network node may adjust, or increase, transmission power allocated to transmission of traffic via the non-terrestrial beam according to a power step value that may be configured via the configuration information received at act 710. The power step value may be a power increase value.

In an embodiment, a power step value configured via configuration information received at act 710 may correspond to a number of user equipment determined to be served by a non-terrestrial beam. For example, if a number of user equipment determined to be served by a particular non-terrestrial beam is determined to exceed a power increase criterion, the non-terrestrial radio network node may determine an amount to increase transmission power allocated to the beam based on how many user equipment are determined, or counted, as being served by the beam. In an example, a power increase criterion may be a value of 1,000 such that if a non-terrestrial beam serves 1,000 or more user equipment the power increase criterion is satisfied at act 720. If only one power step value is configured via the configuration information received at act 710 to be applied to power increases, if the number of user equipment served by the non-terrestrial beam is 1,000 or more user equipment the non-terrestrial radio network node would increase power allocated to the beam according to an amount indicated by the configured power step value.

However, if configuration information received at act 710 comprises multiple power step values that may be applicable to increasing transmission power allocated to a non-terrestrial beam, multiple increase criterion values may be associated with the multiple power step values. For example, one power increase criterion may be 1,000 user equipment and another power increase criterion may be 5,000 user equipment, and the 1,000-count criterion may be associated with a power step value of 1 Watt and the 5,000-count criterion may be associated in configuration information received at act 710 with 5 watts. Thus, according to the example, if the non-terrestrial radio network node determines that 3,000 user equipment are served by a non-terrestrial beam, the 1,000-count power increase criterion would be satisfied and the non-terrestrial radio network node may increase an allocation of transmission power with respect to the non-terrestrial beam by 1 Watt relative to a baseline, or uniform, amount of total transmission power capability corresponding to the non-terrestrial radio network node that may be otherwise allocated to the non-terrestrial beam according to a baseline, or default, transmission power allocation. Continuing with the example, if the non-terrestrial radio network node determines that 7,000 user equipment are served by the non-terrestrial beam, the 5,000-count power increase criterion would be satisfied and the non-terrestrial radio network node may increase an allocation of transmission power with respect to the non-terrestrial beam by 5 Watts.

Similarly, configuration information received at act 710 may comprise at least one power decrease criterion, which may be associated with at least one power step value that may be at least one power decrease step value. The criterion information received act 710 may comprise a criterion that the non-terrestrial radio network node is to determine whether a beam determined to correspond to the lowest number of served or connected user equipment equals or is less than a criterion, for example a power decrease criterion. If at act 720 a non-terrestrial beam is determined by the non-terrestrial radio network node to be serving a lowest number of user equipment, wherein the number of user equipment being served equals or is less than the power decrease criterion, the non-terrestrial network node, at act 725, may adjust (e.g., decrease) an allocation of transmission power to the non-terrestrial beam.

In an embodiment, the non-terrestrial network node may determine to decrease transmission power allocated to a non-terrestrial beam via which a number of user equipment being served equals or is less than the power decreased criterion even if the non-terrestrial beam is not necessarily a non-terrestrial beam serving less user equipment than any other non-terrestrial beam corresponding to the non-terrestrial radio network node. The non-terrestrial radio network node may at act 725 adjust, or decrease, transmission power allocated to transmission of traffic via the non-terrestrial beam according to a power step value that may be configured via the configuration information received at act 710. The power step value may be a power decrease value.

In an example, if a number of user equipment determined to be served by a particular non-terrestrial beam is determined to be less than a power decrease criterion, the non-terrestrial radio network node may determine an amount to decrease transmission power allocated to the beam based on how many user equipment are determined, or counted, as being served by the beam. In an example, a power decrease criterion may be a value of 100 such that if a non-terrestrial beam serves 100 or fewer user equipment, which may occur with respect to a non-terrestrial beam that has a coverage footprint corresponding to an ocean, the power decrease criterion is satisfied at act 720. If only one power step value is configured via the configuration information received at act 710 to be applied to power decreases, if the number of user equipment served by the non-terrestrial beam is equal to or less than 100 user equipment devices the non-terrestrial radio network node may at act 725 decrease power allocated to the beam according to an amount indicated by the configured power step value.

However, if configuration information received at act 710 comprises multiple power step values that may be applicable to decreasing transmission power allocated to a non-terrestrial beam, multiple decrease criterion values may be associated with the multiple power step values. For example, one power decrease criterion may be 100 user equipment and another power decrease criterion may be 50 user equipment, and the 100-count criterion may be associated with a power step value of 0.5 Watt and the 50-count criterion may be associated in configuration information received at act 710 with 1 Watt. Thus, according to the example, if the non-terrestrial radio network node determines that 75 user equipment are served by a non-terrestrial beam, the 100-count power decrease criterion would be satisfied and the non-terrestrial radio network node may at act 725 decrease an allocation of transmission power with respect to the non-terrestrial beam by 0.5 Watt relative to a baseline, or uniform, amount of total transmission power capability corresponding to the non-terrestrial radio network node that may be otherwise allocated to the non-terrestrial beam according to a baseline, or default, transmission power allocation. Continuing with the example, if the non-terrestrial radio network node determines that only 20 user equipment are being served by the non-terrestrial beam during a period for counting as indicated by configuration information received at act 710 (e.g., a period or duration indicated by field 420 shown in FIG. 4), the 50-count power decrease criterion would be satisfied and the non-terrestrial radio network node may at act 725 decrease an allocation of transmission power with respect to the non-terrestrial beam by 1 Watt.

At act 730, after adjusting at least one transmission power amount allocated at act 725 with respect to at least one non-terrestrial beam, the non-terrestrial radio network node may determine, based on a total transmission power capability corresponding to the non-terrestrial radio network node, a remaining transmission power. For example, if the non-terrestrial radio network node allocates an adjusted first amount of transmission power to a first non-terrestrial beam that serves a large, or largest, number of user equipment with respect to other non-terrestrial beams corresponding to the non-terrestrial radio network node, and if the non-terrestrial radio network node allocates an adjusted second amount of transmission power to a second non-terrestrial beam that serves a small, or smallest, number of user equipment with respect to the other non-terrestrial beams, the remaining transmission power may be the total transmission power capability less the adjusted first amount of transmission power and less the adjusted second amount of transmission power. The non-terrestrial radio network node may equally, or uniformly, allocate the remaining transmission power to remaining non-terrestrial beams corresponding to the non-terrestrial radio network node that are non-terrestrial beams other than the first non-terrestrial beam or the second non-terrestrial beam. At act 735, a non-terrestrial radio network node may transmit traffic directed to non-terrestrial-capable user equipment devices (e.g., user equipment that are designed or configured to communicate with a non-terrestrial radio network node according to non-terrestrial frequencies, power levels or other non-terrestrial parameters) via non-terrestrial beams according to transmission power allocated to the non-terrestrial beams at acts 725 and 730. Method 700 advances to act 740 and ends.

Turning now to FIG. 8, the figure illustrates an example embodiment method 800 comprising at block 805 determining, by a non-terrestrial radio network node comprising at least one processor, at least one number of user equipment being served by at least one non-terrestrial beam corresponding to the non-terrestrial radio network node to result in at least one determined served number corresponding to at least one determined beam of the at least one non-terrestrial beam; at block 810 analyzing, by the non-terrestrial radio network node, the at least one determined served number with respect to at least one beam power allocation criterion to result in at least one analyzed determined served number; and at block 815 based on the at least one analyzed determined served number being determined to satisfy the at least one beam power allocation criterion, determining, by the non-terrestrial radio network node, at least one determined transmission power corresponding to the at least one determined beam.

Figure 9:
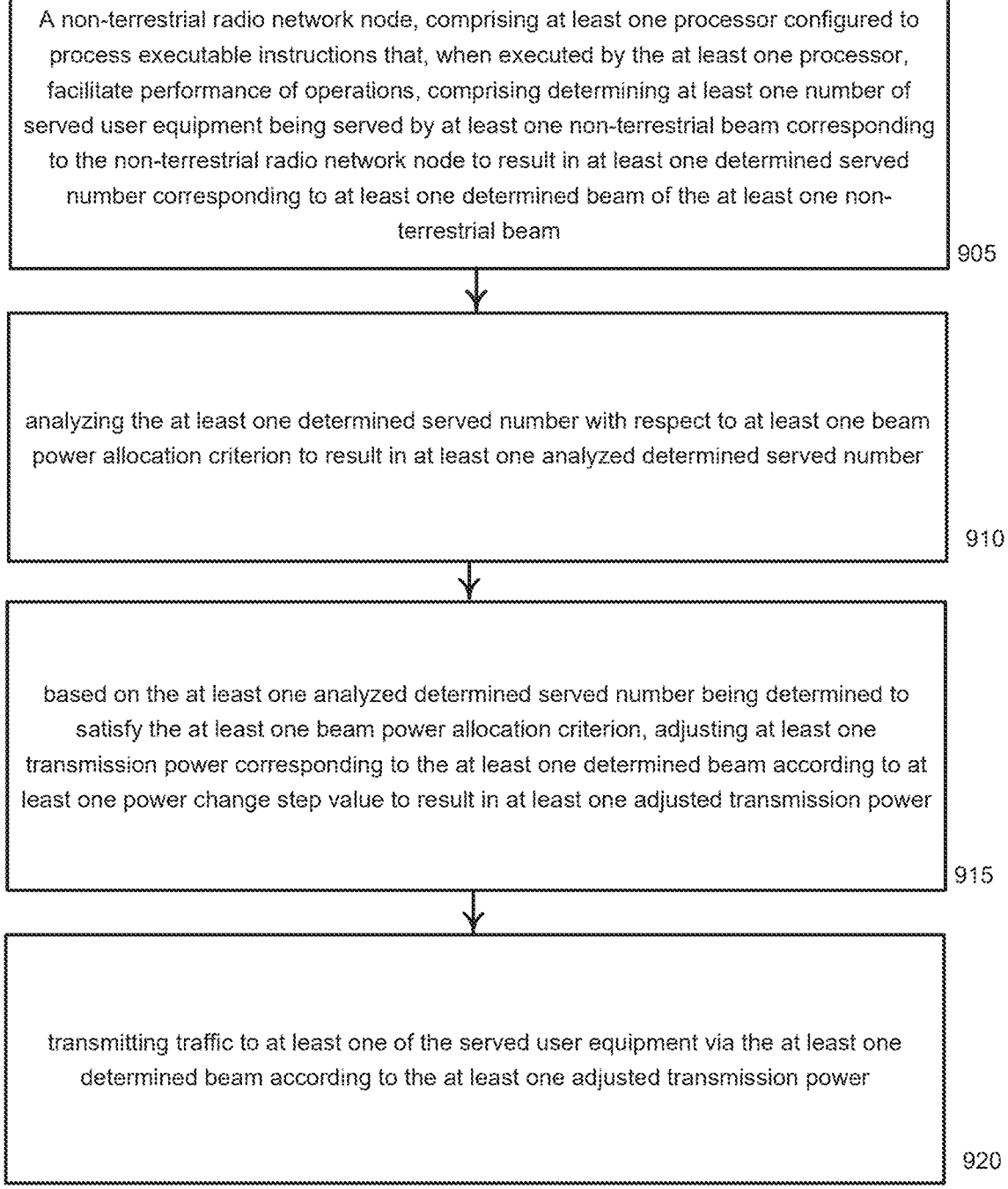
FIG. 9 illustrates a block diagram of an example non-terrestrial radio network node in accordance with an embodiment of the subject application.

Turning now to FIG. 9, the figure illustrates a non-terrestrial radio network node 900, comprising at block 905 at least one processor configured to process executable instructions that, when executed by the at least one processor, facilitate performance of operations, comprising determining at least one number of served user equipment being served by at least one non-terrestrial beam corresponding to the non-terrestrial radio network node to result in at least one determined served number corresponding to at least one determined beam of the at least one non-terrestrial beam; at block 910 analyzing the at least one determined served number with respect to at least one beam power allocation criterion to result in at least one analyzed determined served number; at block 915 based on the at least one analyzed determined served number being determined to satisfy the at least one beam power allocation criterion, adjusting at least one transmission power corresponding to the at least one determined beam according to at least one power change step value to result in at least one adjusted transmission power; and at block 920 transmitting traffic to at least one of the served user equipment via the at least one determined beam according to the at least one adjusted transmission power.

Figure 10:
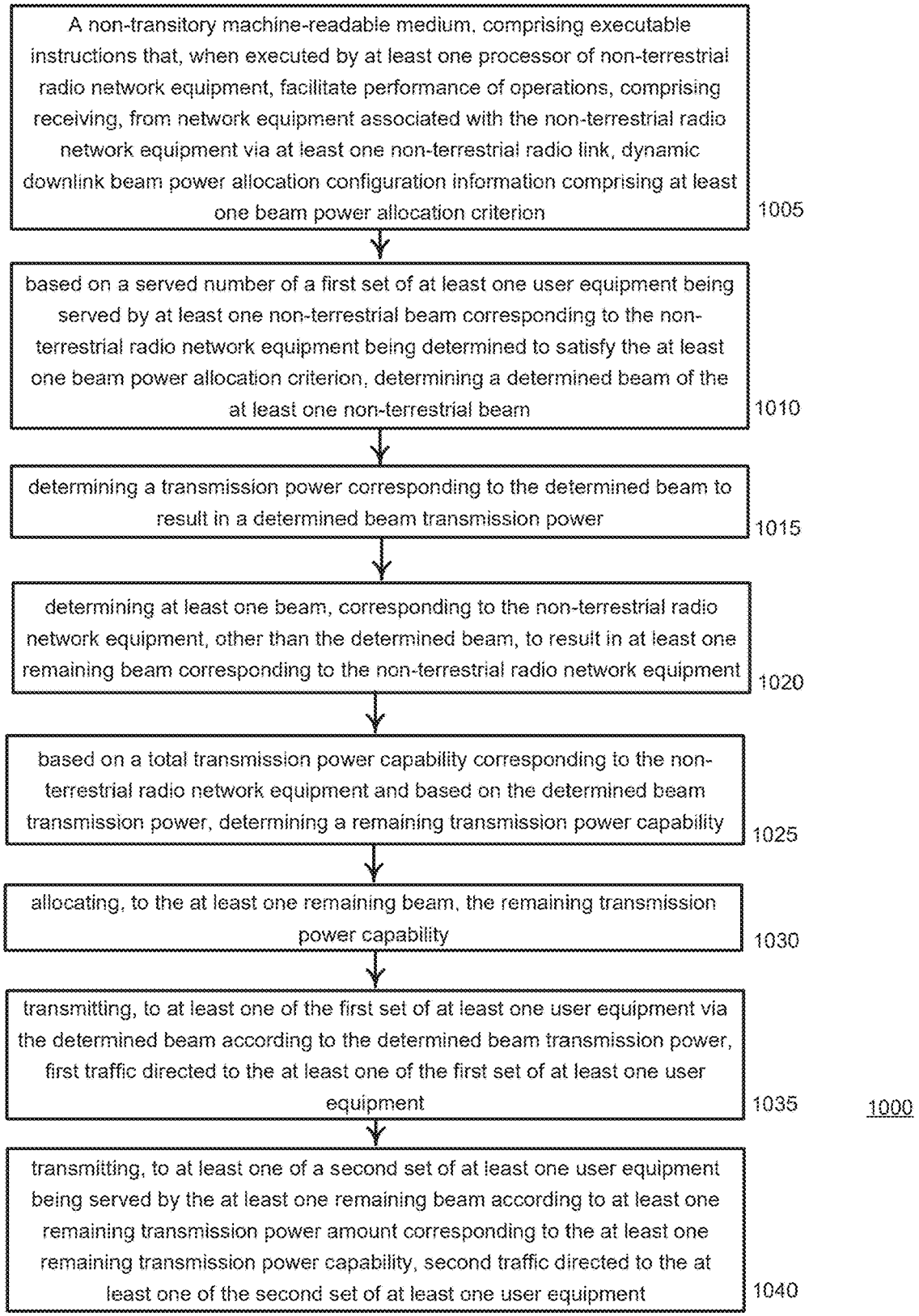
FIG. 10 illustrates a block diagram of an example non-transitory machine-readable medium in accordance with an embodiment of the subject application.

Turning now to FIG. 10, the figure illustrates a non-transitory machine-readable medium 1000 comprising at block 1005 executable instructions that, when executed by at least one processor of a non-terrestrial radio network equipment, facilitate performance of operations, comprising receiving, from network equipment associated with the non-terrestrial radio network equipment via at least one non-terrestrial radio link, dynamic downlink beam power allocation configuration information comprising at least one beam power allocation criterion; at block 1010 based on a served number of a first set of at least one user equipment being served by at least one non-terrestrial beam corresponding to the non-terrestrial radio network equipment being determined to satisfy the at least one beam power allocation criterion, determining a determined beam of the at least one non-terrestrial beam; at block 1015 determining a transmission power corresponding to the determined beam to result in a determined beam transmission power; at block 1020 determining at least one beam, corresponding to the non-terrestrial radio network equipment, other than the determined beam, to result in at least one remaining beam corresponding to the non-terrestrial radio network equipment; at block 1025 based on a total transmission power capability corresponding to the non-terrestrial radio network equipment and based on the determined beam transmission power, determining a remaining transmission power capability; at block 1030 allocating, to the at least one remaining beam, the remaining transmission power capability; at block 1035 transmitting, to at least one of the first set of at least one user equipment via the determined beam according to the determined beam transmission power, first traffic directed to the at least one of the first set of at least one user equipment; and at block 1040 transmitting, to at least one of a second set of at least one user equipment being served by the at least one remaining beam according to at least one remaining transmission power amount corresponding to the at least one remaining transmission power capability, second traffic directed to the at least one of the second set of at least one user equipment.

Figure 11:
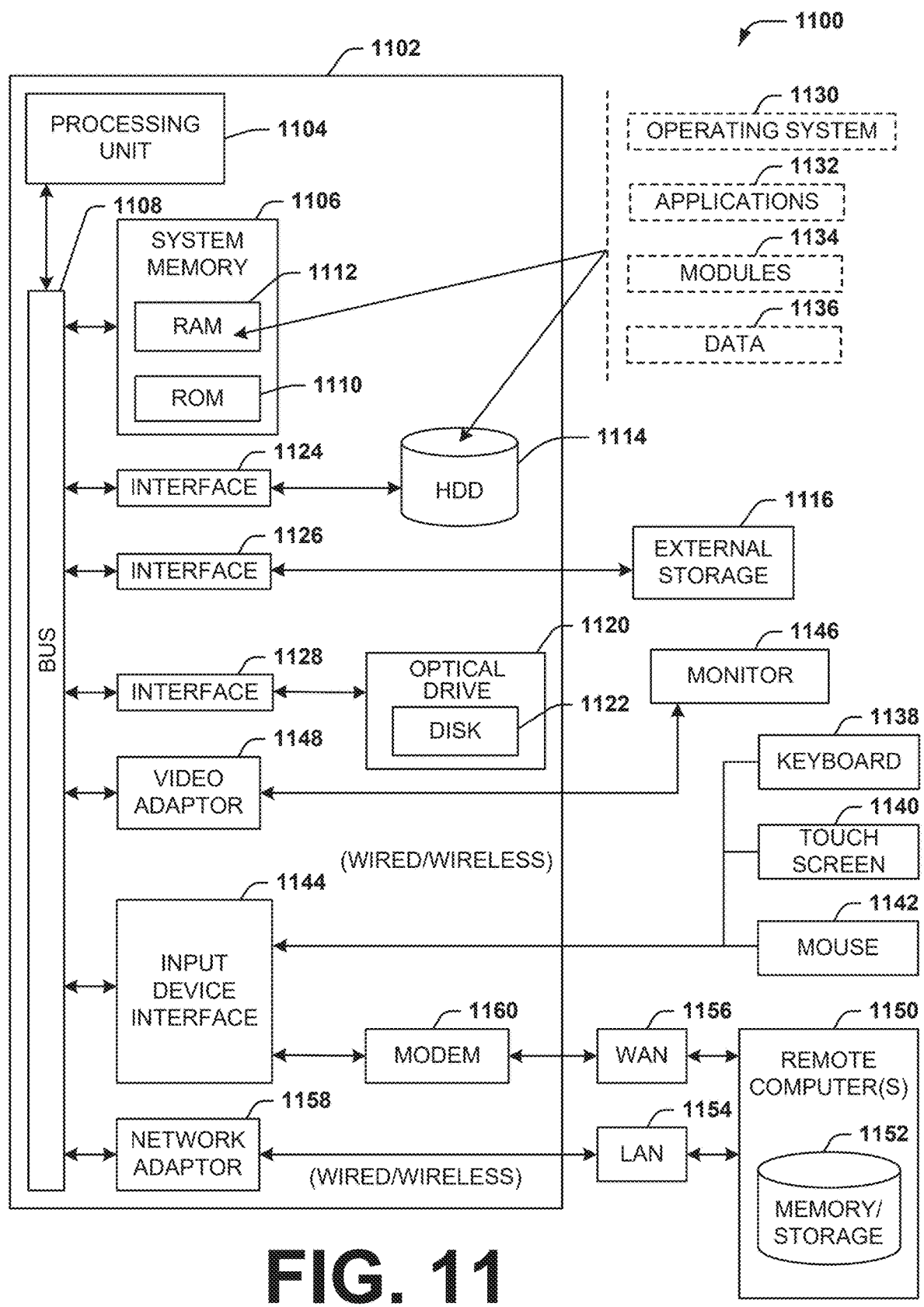
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
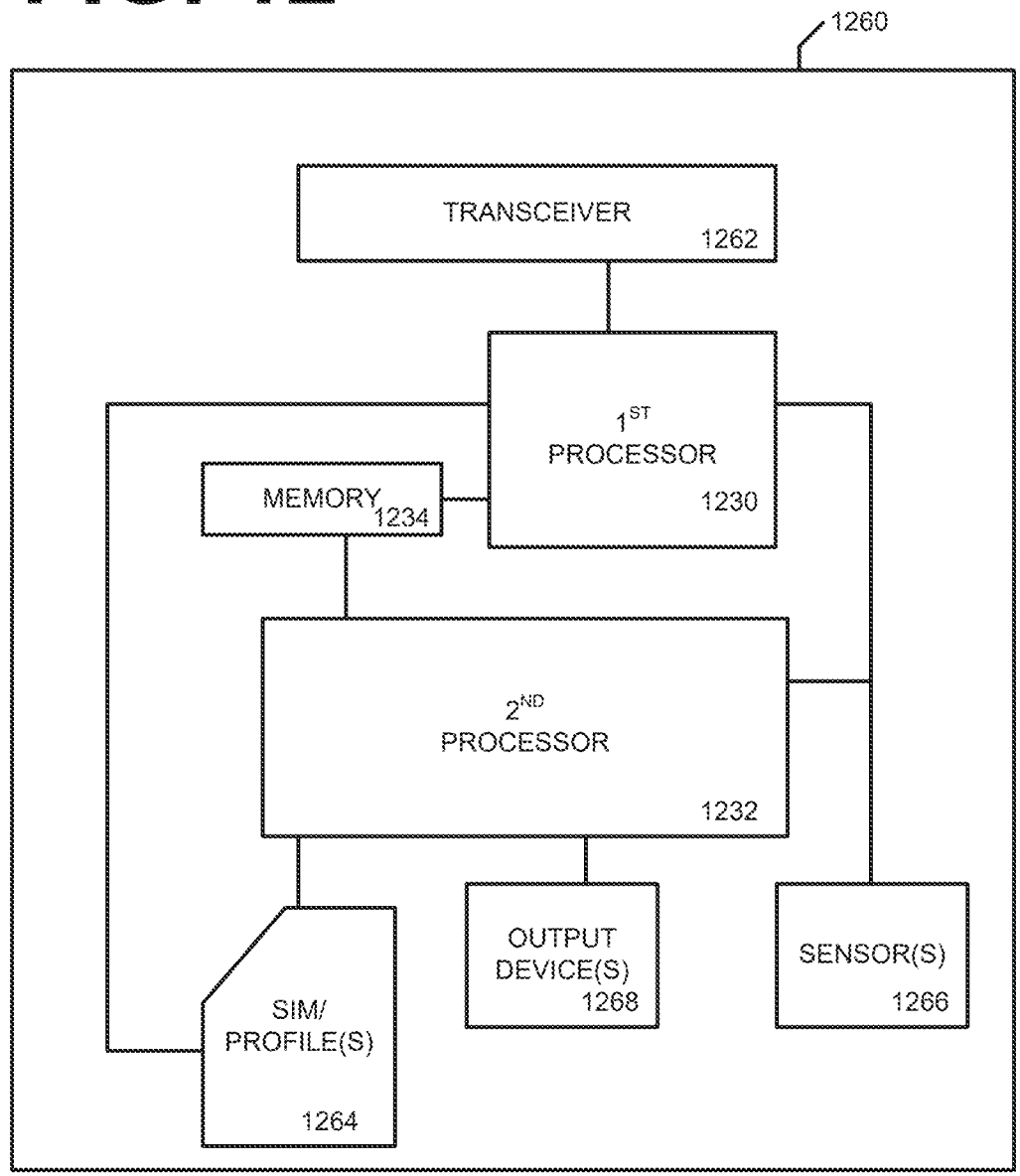
FIG. 12 illustrates a block diagram of an example wireless UE.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 112, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only is going to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| UE | User equipment |
| WTRU | Wireless transmit receive unit |
| CBR | Channel busy ratio |
| SCI | Sidelink control information |
| QoS | Quality of service |
| PER | Packet error rate |
| PDB | Packet delay budget |
| E2E | End to end |
| NES | Network energy saving |
| QCI | Quality class indication |
| RSRP | Reference signal received power |
| PCI | Primary cell ID |
| CSI-RS | Channel state information reference signals |
| PTRS | Phase tracking reference signals |
| DTX | Discontinuous transmission or discontinuous transmit |
| DRX | Discontinuous reception or discontinuous receive |
| CG | Configured grant |
| ULP | Uplink power |
| FBS | Fake base station |
| NTN | Non-terrestrial network |
| gRAN | Ground radio access network |
| RAN | Radio access network |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a non-terrestrial radio network node comprising at least one processor, at least one number of user equipment being served by at least one non-terrestrial beam corresponding to the non-terrestrial radio network node to result in at least one determined served number corresponding to at least one determined beam of the at least one non-terrestrial beam;
   analyzing, by the non-terrestrial radio network node, the at least one determined served number with respect to at least one beam power allocation criterion to result in at least one analyzed determined served number; and
   based on the at least one analyzed determined served number being determined to satisfy the at least one beam power allocation criterion, determining, by the non-terrestrial radio network node, at least one determined transmission power corresponding to the at least one determined beam.

2. The method of claim 1, wherein the determining of the at least one determined transmission power comprises, based on the at least one analyzed determined served number being determined to satisfy the at least one beam power allocation criterion, adjusting, by the non-terrestrial radio network node, at least one transmission power corresponding to the at least one determined beam according to at least one power change step value to result in the at least one determined transmission power being at least one adjusted transmission power.

3. The method of claim 2, wherein the at least one beam power allocation criterion comprises at least one power increase criterion, wherein the at least one analyzed determined served number being determined to satisfy the at least one beam power allocation criterion comprises determining that the at least one analyzed determined served number equals or exceeds the at least one power increase criterion, and wherein the adjusting of the at least one transmission power comprises increasing transmission power corresponding to the at least one determined beam.

4. The method of claim 3, wherein the at least one beam power allocation criterion further comprises a criterion that the at least one determined beam correspond to a highest served number of the at least one determined served number, and wherein the at least one analyzed determined served number being determined to satisfy the at least one beam power allocation criterion further comprises determining that the at least one analyzed determined served number is higher than other of the at least one analyzed determined served number corresponding to other beams of the at least one non-terrestrial beam corresponding to the non-terrestrial radio network node.

5. The method of claim 2, wherein the at least one beam power allocation criterion comprises at least one power decrease criterion, wherein the at least one analyzed determined served number being determined to satisfy the at least one beam power allocation criterion comprises determining that the at least one analyzed determined served number equals or does not exceed the at least one power decrease criterion, and wherein the adjusting of the at least one transmission power comprises decreasing transmission power corresponding to the at least one determined beam.

6. The method of claim 5, wherein the at least one beam power allocation criterion further comprises a criterion that the at least one determined beam correspond to a lowest served number of the at least one determined served number, and wherein the at least one analyzed determined served number being determined to satisfy the at least one beam power allocation criterion further comprises determining that the at least one analyzed determined served number is lower than other of the at least one analyzed determined served number corresponding to other beams of the at least one non-terrestrial beam corresponding to the non-terrestrial radio network node.

7. The method of claim 2, wherein the adjusting of the at least one transmission power comprises adjusting the at least one transmission power according to a power step value that corresponds to the at least one analyzed determined served number.

8. The method of claim 2, wherein the at least one determined beam comprises a first beam and a second beam, wherein the at least one determined served number comprises a first determined served number and a second determined served number, respectively corresponding to the first beam and the second beam, wherein the at least one adjusted transmission power comprises a first adjusted transmission power corresponding to the first beam and a second adjusted transmission power corresponding to the second beam, and wherein the first adjusted transmission power is different than the second adjusted transmission power.

9. The method of claim 1, further comprising:
   based on a total transmission power capability corresponding to the non-terrestrial radio network node and based on the at least one determined transmission power, determining, by the non-terrestrial radio network node, a remaining transmission power capability corresponding to the non-terrestrial radio network node to result in a determined remaining transmission power capability; and
   allocating the determined remaining transmission power capability to at least one remaining beam, other than the at least one determined beam, corresponding to the non-terrestrial radio network node.

10. The method of claim 9, wherein the at least one remaining beam comprises multiple remaining beams, and wherein the determined remaining transmission power capability is allocated equally to the multiple remaining beams to result in an equal transmission power amount being allocated to each of the multiple remaining beams.

11. The method of claim 10, wherein the determining of the at least one determined transmission power comprises, based on the at least one analyzed determined served number being determined to satisfy the at least one beam power allocation criterion, adjusting at least one transmission power corresponding to the at least one determined beam according to at least one power change step value to result in the at least one determined transmission power being at least one adjusted transmission power, and
   wherein the equal transmission power amount allocated to each of the multiple remaining beams is different than the at least one adjusted transmission power.

12. A non-terrestrial radio network node, comprising at least one processor configured to process executable instructions that, when executed by the at least one processor, facilitate performance of operations, comprising:
   determining at least one number of served user equipment being served by at least one non-terrestrial beam corresponding to the non-terrestrial radio network node to result in at least one determined served number corresponding to at least one determined beam of the at least one non-terrestrial beam;

analyzing the at least one determined served number with respect to at least one beam power allocation criterion to result in at least one analyzed determined served number;

based on the at least one analyzed determined served number being determined to satisfy the at least one beam power allocation criterion, adjusting at least one transmission power corresponding to the at least one determined beam according to at least one power change step value to result in at least one adjusted transmission power; and transmitting traffic to at least one of the served user equipment via the at least one determined beam according to the at least one adjusted transmission power.

13. The non-terrestrial radio network node of claim 12, wherein the operations further comprise:

receiving dynamic downlink beam power allocation configuration information, directed to the non-terrestrial radio network node by core network equipment, comprising the at least one beam power allocation criterion and the at least one power change step value.

14. The non-terrestrial radio network node of claim 13, wherein the dynamic downlink beam power allocation configuration information comprises at least one beam power update period duration indication indicative of at least one beam power update period duration during which the at least one determined served number is to be determined.

15. The non-terrestrial radio network node of claim 13, wherein the at least one beam power allocation criterion comprises at least one power increase criterion usable to determine that the at least one number of served user equipment being served by the at least one non-terrestrial beam equals or exceeds the at least one power increase criterion, wherein the at least one beam power allocation criterion comprises at least one power decrease criterion usable to determine that the at least one number of served user equipment being served by at least one non-terrestrial beam equals, or is less than, the at least one power decrease criterion, wherein the at least one power change step value comprises a power increment value according to which the at least one transmission power corresponding to the at least one determined beam is to be increased, based on the at least one number of served user equipment being determined to equal or exceed the at least one power increase criterion, to result in the at least one adjusted transmission power being an increased transmission power, and wherein the at least one power change step value comprises a power decrement value according to which the at least one transmission power corresponding to the at least one determined beam is to be decreased, based on the at least one number of served user equipment being determined to equal or, or to be less than, the at least one power decrease criterion, to result in the at least one adjusted transmission power being a decreased transmission power.

16. The non-terrestrial radio network node of claim 12, wherein the operations further comprise:

determining at least one beam, corresponding to the non-terrestrial radio network node, other than the at least one determined beam, to result in at least one remaining beam corresponding to the non-terrestrial radio network node;

based on a total transmission power capability corresponding to the non-terrestrial radio network node, determining a remaining transmission power capability; and allocating, to the at least one remaining beam, the remaining transmission power capability.

17. The non-terrestrial radio network node of claim 16, wherein the at least one beam power allocation criterion comprises a first beam power allocation criterion and a second beam power allocation criterion, wherein the at least one analyzed determined served number is a first analyzed determined served number, wherein the at least one determined beam is determined based on the first analyzed determined served number being determined to satisfy the first beam power allocation criterion, wherein the at least one remaining beam is a first remaining beam, and wherein the operations further comprise:

determining at least one number of served user equipment being served by the first remaining beam to result in a first determined remaining served number;

analyzing the first determined remaining served number with respect to the second beam power allocation criterion to result in a first analyzed determined remaining served number;

based on the first analyzed determined remaining served number being determined to satisfy the second beam power allocation criterion, determining at least one transmission power corresponding to the first remaining beam to result in a first determined remaining transmission power;

determining at least one beam other than the at least one determined beam and the first remaining beam, to result in at least one second determined remaining beam;

based on the total transmission power capability and the first determined remaining transmission power, determining a second determined remaining transmission power; and allocating, to the at least one second determined remaining beam, the second determined remaining transmission power.

18. A non-transitory machine-readable medium, comprising executable instructions that, when executed by at least one processor of non-terrestrial radio network equipment, facilitate performance of operations, comprising:

receiving, from network equipment associated with the non-terrestrial radio network equipment via at least one non-terrestrial radio link, dynamic downlink beam power allocation configuration information comprising at least one beam power allocation criterion;

based on a served number of a first set of at least one user equipment being served by at least one non-terrestrial beam corresponding to the non-terrestrial radio network equipment being determined to satisfy the at least one beam power allocation criterion, determining a determined beam of the at least one non-terrestrial beam;

determining a transmission power corresponding to the determined beam to result in a determined beam transmission power;

determining at least one beam, corresponding to the non-terrestrial radio network equipment, other than the determined beam, to result in at least one remaining beam corresponding to the non-terrestrial radio network equipment;

based on a total transmission power capability corresponding to the non-terrestrial radio network equipment and based on the determined beam transmission power, determining a remaining transmission power capability;

allocating, to the at least one remaining beam, the remaining transmission power capability;

transmitting, to at least one of the first set of at least one user equipment via the determined beam according to the determined beam transmission power, first traffic directed to the at least one of the first set of at least one user equipment; and transmitting, to at least one of a second set of at least one user equipment being served by the at least one remaining beam according to at least one remaining transmission power amount corresponding to the at least one remaining transmission power capability, second traffic directed to the at least one of the second set of at least one user equipment.

19. The non-transitory machine-readable medium of claim 18, wherein the at least one remaining beam comprises multiple remaining beams, wherein the at least one remaining transmission power amount is allocated to the multiple remaining beams to result in each of the multiple remaining beams being allocated a divided remaining beam transmission power amount, and wherein the determined beam transmission power is different that the divided remaining beam transmission power amount.

20. The non-transitory machine-readable medium of claim 18, wherein the at least one beam power allocation criterion comprises a power increase criterion and a power decrease criterion, wherein the served number of the at least one of the first set of at least one user equipment being determined to satisfy the at least one beam power allocation criterion comprises: the served number of the at least one of the first set of at least one user equipment being determined to be equal to or greater than the power increase criterion or the served number of the at least one of the first set of at least one user equipment being determined to be equal to or less than the power decrease criterion.

* * * * *